United States Patent [19]

Kosich

[11] Patent Number: 4,815,120
[45] Date of Patent: Mar. 21, 1989

[54] COMPUTERIZED TELEPHONE MONITORING SYSTEM

[75] Inventor: Milo Kosich, Cuyahoga Falls, Ohio

[73] Assignee: Enforcement Support Incorporated, Cuyahoga Falls, Ohio

[21] Appl. No.: 78,593

[22] Filed: Jul. 28, 1987

[51] Int. Cl.[4] ................... H04M 15/04; H04M 15/18; H04M 15/22; H04M 3/22

[52] U.S. Cl. ........................................ 379/34; 379/35; 379/135; 379/136; 379/113

[58] Field of Search ............... 379/112, 113, 130, 133, 379/140, 34, 35, 135, 136, 122

[56] References Cited

U.S. PATENT DOCUMENTS 4,712,230  12/1987  Rice et al. ........................... 379/112

OTHER PUBLICATIONS

JSI Telecon J1066 Dial-Up Slave System Users Manual, Undated (Unit Appeared in the Marketplace about May, 1987).
JSI Telecom J1033C Dialed Number Recorder Users Manual, Undated (Unit Appeared in the Marketplace about Feb., 1987).
Discovery Technical Manual published by Mitel Datacon, Issue 1, May, 1987.

Primary Examiner—Stafford D. Schreyer
Attorney, Agent, or Firm—Buchanan Ingersoll

[57] ABSTRACT

A telephone monitoring system is disclosed which enables the operator to enter comment data and sort comment data entered by the operator and numerical data received from a monitor while the monitor continues to imput information from the target line. The system is comprised generally of a monitor capable of being attached to a target telephone line and when so attached senses voltage changes on that line and translates those voltage changes into a form capable of being stored in the memory, an alphanumeric keyboard, a memory unit storing a program capable of storing data received from the monitor and the keyboard, a processing unit and a display for displaying data entered through the monitor and through the keyboard as well as data developed by the processing unit in accordance with the program contained in the memory.

18 Claims, 1 Drawing Sheet

COMPUTERIZED TELEPHONE MONITORING SYSTEM

FIELD OF INVENTION

The invention relates to systems for monitoring telephone calls, sometimes referred to as wiretap devices.

BACKGROUND OF THE INVENTION

Wiretap devices are designed to intercept and record telephonic data from a target telephone line. Two basic types of wiretaps are conducted using the same unit, operated in either DNR or T3 mode. One type of wiretap is known as dialed number recording (DNR) which records the number dialed, date, time and duration of the call. The second is called a Title III wiretap. This is the recording of the same information as the dialed number recording, but also allows for recording of actual conversations occurring on the target line. The typical wiretap device does not record audio or conversational information. Rather, it prompts tape recorders to start upon pick-up of the telephone receiver and to stop upon the return of the receiver to the cradle. A typical wiretap device produces a hard copy of numerical data, using an adding machine tape, showing items such as case number, time of call, date, numbers dialed, whether the call is incoming or outgoing, origination of the call and whether or not tape recorders have been started and stopped.

More recently, wiretap devices have been created which include computer technology and microprocessing capabilities. These capabilities have been directed to enable more automatic interception and logging of calls by the device than was previously possible. In addition, they enable storage of the numerical information developed by the wiretap device. Frequently, an RS 232 port is provided which allows the user to dump the collected telephone data directly into a computer. The computer is treated as a register for the data to be analyzed through the use of a separate analysis program at a later time.

Wiretap devices can be connected directly to a target line or connected through a dial-up slave. A slave is a small device that can be attached to the target line in a remote location such as on a telephone pole. A second telephone line is also connected to the slave from which the slave can draw power. The slave enables access to the target line at any distance from the monitoring point by way of a second telephone line. In operation the monitor dials the slave reaching it through the second telephone line and then receives information from the target line through the slave and second telephone line. Slave type connections are well known in the art. Whenever I speak of a monitor being connected to a target line, it should be understood that the connection may be direct or through a slave.

The role the operator or user of the prior art systems is limited to simply hooking up the device to the appropriate telephone lines and monitoring activity. The laws of the United States provide that if the wiretap device is only collecting numerical data an operator need not be present while the device is in operation. However, if the wiretap device is activating tape recorders that are recording telephone conversations an officer must be present during the recording to avoid recording privileged information. The laws of the United States require that certain telephone conversations, such as those between an attorney and client, may not be recorded by the police authorities. If a recording is made, information collected by the wiretap may jeopardize the actual case in court proceedings. Consequently, the operator is always called upon to keep a log of notes pertinent to the investigation. He may be called upon to establish he was not listening to any calls which were not tape recorded.

It is standard practice for the agency conducting the wiretap to provide a print-out of the numerical wiretap data from the wiretap system to a clerk/typist at headquarters. The clerk types the numerical data into a computer system which then has appropriate programing to allow data analysis. Additionally, the monitoring officer must prepare a contemporaneous log of the wiretap activities. Those notes are then typed at a later time frequently by someone other than the wiretap device operator. The report or log might identify particular phone numbers as belonging to a named individual, a drug dealer or a bookie. It also may describe the type of transaction conducted when a given number was called. The operator may also have notes about particular telephone conversations which he heard while the monitoring device was in operation.

During periods of inactivity, which are inevitable in an audio wiretap, there is little for an operator of the prior art devices to do. Consequently, he often spends that time reading books and doing other things not related to the surveillance operation. Since the operator is being paid for this time, it is desirable to have him do work related to the investigation such as analyzing the wiretap data that has been accumulated. However, presently available wiretap devices do not permit the operator during the surveillance to analyze the data collected.

There is a need for a monitoring device which will enable the operator to retrieve, analyze and manipulate data collected by the wiretap machine. There is a further need for a wiretap system which will allow the gathering and analyzing of telephonic data without requiring that the data be downloaded into another system. There is also a need for a monitoring system which will enable the operator to input data relevant to the surveillance operation while the monitoring device is in operation. Preferably that data should be capable of being reproduced in typewritten form. There is further need for a wiretap system which will allow the operator to sort through and locate calls by their conversational content while the monitor is collecting data from the target line. There is further need for a monitoring system which will enable the user to insert comments relating to the wiretap as the data is collected by the monitor.

SUMMARY OF THE INVENTION

The present invention provides a wiretap system which meets the shortcomings of prior art systems. With this system, the operator can enter and manipulate data while the monitor is in operation receiving information from the target line. My system is comprised generally of a monitor which is connected to the target line and translates voltages into digital information suitable or computer, a keyboard to permit the operator to enter data, a screen which displays data entered by the operator and collected by the monitor, a clock, a disc drive suitable for floppy discs onto which data from the internal memory can be transferred, a processing unit and a memory. The memory should have a minimum capacity of 512K. A memory of that size is capable of containing a data processing program, data from the monitor, data entered by the operator through a keyboard and data generated by the data processing program. I prefer to provide programing within the internal memory which allows the user to sort the telephone information received from the monitor by telephone number or portion of number, hour, call type, length of call, number of digits, date, and to allow a complete print-out of all numerical information received from the monitor. I further prefer to provide a program which allows information received from the monitor to be displayed on a screen and simultaneously stored in memory. I further prefer to provide a program which will enable the operator to enter data through the keyboard into the internal memory while at the same time the data being entered is shown on the screen. I further prefer to provide a program which allows the operator to create at least one comment field that can be automatically retrieved by pressing a key on the keyboard. I also prefer to provide a program which allows the user to sort data he has entered through the keyboard. Other details, objects and advantages of the invention will become apparent as a description of the preferred embodiments proceeds.

DESCRIPTION OF THE PREFERRED EMBODIMENTS

Figure 1:
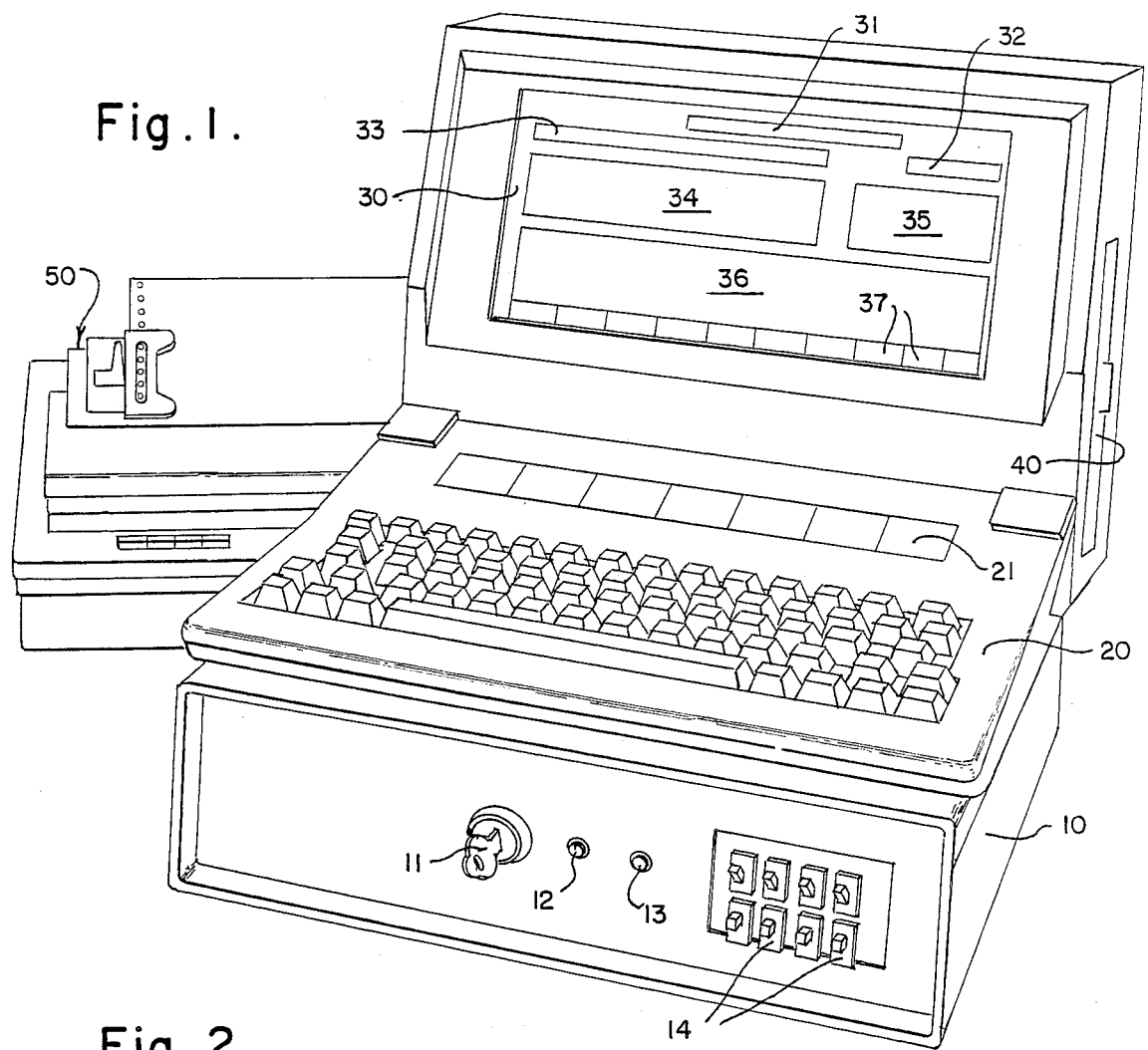
FIG. 1 is a perspective view of a present preferred embodiment of my wiretap device.
Figure 2:
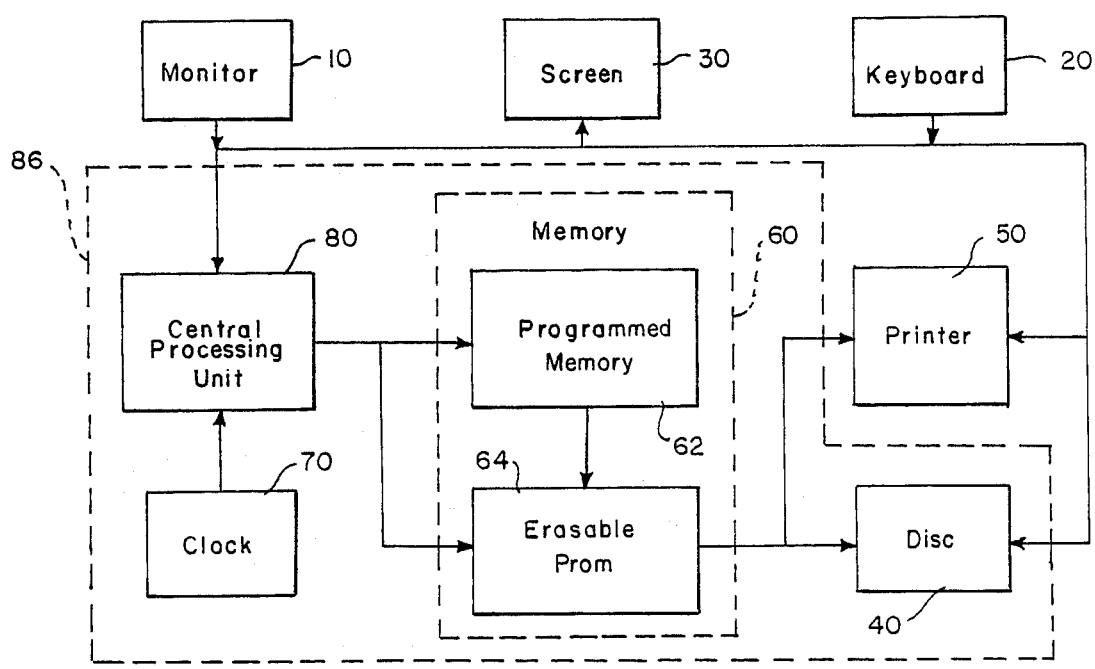
FIG. 2 is a block diagram illustrating the operation of my telephone monitoring device.

Referring to the drawings, I provide a monitor 10 which is suitable for attachment to a target line directly or through a slave, the monitor translates voltage changes into data capable of being received and stored in a memory. I also provide an alphanumeric keyboard 20, a display screen 30, disc drive 40 and printer 50. I prefer to provide 11 in the monitor which can be used to turn the system audio on and off. I also prefer to provide indicator lights 12 and 13 which indicate whether power is on and whether the telephone on the target line is in use or "off hook". I also prefer to control tape recorder operation from the alphanumeric keyboard or via a keylock switch on the front panel of the monitor to turn tape recorders on and off and to turn a headpiece output on and off. The headpiece enables the operator to hear the conversation. Keyboard 20 is an alphanumeric keyboard with additional function keys 21. These function keys enable the operator to create phrases or comments that can be stored in memory and recalled by pressing a function key. The screen 30 is configured so as to be able to report numerical data obtained by the monitor as well as comment data entered by the operator I prefer to display the phone number being monitored at the top of the screen as indicated by box 31. The date and time appear in the upper right hand corner in box 32. In the upper left of the screen in box 33 I report the number dialed by the target telephone and whether that telephone is on hook or off hook. Numerical data generated by the monitor is displayed in box 34. This data includes off hook time, on hook time, call duration, audio status and a sequence number identifying the call. Such information is not generally available on any prior art monitoring systems. In box 35 I display alarm numbers which significance as for example the telephone number of the suspect's attorney. A major portion of the screen 36 is devoted to reproduction of data stored and sorted by the system as well as comments entered by the operator. This box could also be used to display case number, judge name and court number. Finally, boxes 37 are provided at the bottom of the screen which correspond to and identify the function keys 21. In a present preferred embodiment of my system some of these keys are programed to stop the monitor, turn the audio on and off, turn the printer on or off, enter initial data, sort data, output screen and manual print in a short or long format. These designations appear in boxes 37 to indicate which key has each function. In a present preferred embodiment of my system I program the function keys for STOP MONITOR, AUDIO ON/OFF, PRINT ON/OFF/SHORT/LONG, ENTER SPEC, EXIT SORT, OUTPUT SCREEN/PRINTER and MANUAL PRINT, ENTER REMARKS, ONLINE SORT, EDIT REMARKS, EDIT KEYBOARD, EDIT ALARMS. The disc drive 40 is any drive suitable for holding a floppy disc onto which information from an internal memory 60 can be dumped. Finally, I provide a printer 50 which can print out information displayed on screen 30, information developed by the monitor 10, even if it is not displayed on the screen, and information entered through the keyboard 20. Since comment information will be printed, the printer is preferably able to print at least eighty characters per line. Preferably, the printer has a continuous paper feed mechanism. Referring to FIG. 2, it can be seen that data obtained by the monitor 10 is input, through an RS-232 port, to a central processing unit 80 and stored in memory 60. If desired, that same information can be displayed on the screen 30 as it enters the memory. Also, data can be entered through keyboard 20 passing through a central processing unit into a memory 60. I prefer to provide a clock 70 which is programed to make time entries whenever data is entered either through the monitor or the keyboard. The memory consists of a programed memory 62 and an erasable programmable memory 64. Those memories can be contained in one or more memory boards. The programed memory 62 contains a program for manipulating data received from the monitor and the keyboard. The erasable memory 64 contains the data received from the monitor and the keyboard. I prefer to provide within the memory a buffer system which can receive data from the monitor at all times. When the buffer is filled it would automatically dump the information to a disc contained in disc drive 40. I have found that central processing unit 80, clock 70, memory 60, and disc drive 40 can be contained in a personal computer 86 such as the Zenith 171-42 computer having an upgraded 512K RAM. In such instances the monitor, keyboard and printer would be connected through standard ports on that computer. For my printer I prefer to use a Okidata 182 printer. It is economical and compact enough to contribute to overall system portability. I further prefer to upgrade the 182 printer with tractor feed to accommodate standard computer paper.

My system can be packed in a flight storage case and easily set up for field use. First, the monitor unit 10 is interconnected to the computer and the computer to the printer 50. The ring and tip of the target line are inserted into the provided push terminals (not shown) on the back panel of the monitor. If one desires a full audio wiretap, audio and remote terminals would then be connected to the appropriate tape recorder inputs 14.

At this point set up is complete -- normally in five minutes or less.

To begin the monitoring process, the program disc I provide is inserted into the front drive of the computer, and a formated or unformated data disc is placed in the rear drive. Then the computer is switched on. The computer screen will display three options:

1. START MONITOR
2. EDIT CASE FILE
3. EXIT TO DOS

To begin the monitor process, one would choose #1.

The screen will then ask for a file number, case number, judge number or name, and court number or name so the information to be stored on the data disc can be retrieved later. This information will appear as a heading on all printed reports generated regarding this file. Also, it should be noted these headings can easily be customized to fit any police procedure. This completes set up. The unit is now on line, usually in less than ten minutes.

At all times the computer screen will indicate call status, what numbers are being dialed by the target line, phone number being monitored, time off hook, time on hook, duration, audio status, alarm numbers and call number. Incoming calls are denoted by "Incoming".

At the bottom of the computer monitor screen the phrase "STOP MONITOR" to stop monitoring appears continuously. Having tracked calls for some periods of time, one may begin the sorting process by pressing the "ENTER SPEC" key, and the sorting criteria will appear in the comments frame of the computer screen. The agent would then choose the type search he would like to see, and by choosing the appropriate option he will instantly be provided with a scrollable screen or hard copy of all calls which fit the search criteria while staying on line.

Since my system creates a data base on all calls on the data disc, this data is available for manipulation by any number of analytical programs, again without any transcription necessary. The data diskette can also down load its calls to a larger mainframe data storage system for storage or analysis. The data diskette itself would be put into the case evidence file.

Although I have described and illustrated certain present preferred embodiments of my system, it should be distinctly understood that my invention is not limited thereto, but may be variously embodied within the scope of the following claims.

I claim:

1. A telephone monitoring system comprising:
   (a) a monitor capable of being attached to a target telephone line and when so attached sense voltage changes on that line and translate those voltage changes into a form capable of being stored in a memory;
   (b) an alphanumeric keyboard to allow an operator to input data into a memory;
   (c) a memory unit storing a program and capable of storing data received from the monitor and the keyboard;
   (d) a processing unit connected to the monitor, keyboard and memory for receiving data from the monitor and keyboard and manipulating that data in accordance with a program contained in the memory; and
   (e) a display connected to the processing unit, keyboard and monitor for displaying data entered through the monitor and keyboard and data developed by the processing unit in accordance with a program contained in the memory.

2. The telephone monitoring system of claim 1 also comprising a clock connected to the processing unit.

3. The telephone monitoring system of claim 1 also comprising a disc drive connected to the processing unit and memory.

4. The telephone monitoring system of claim 1 also comprising a printer.

5. The telephone monitoring system of claim 4 wherein the printer is capable of printing at least eighty characters per line.

6. The telephone monitoring system of claim 1 wherein the monitor has means for connecting at least one tape recorder to the target telephone lines and means for activating and deactivating a tape recorder.

7. The telephone monitoring system of claim 6 also comprising means connected to the monitor for determining when the tape recorders are activated and deactivated and for transmitting that determination to the memory.

8. The telephone monitoring system of claim 1 also comprising a headphone connected to the monitor.

9. The telephone monitoring system of claim 8 also comprising means connected to the monitor for determining when audio output to the headphone is activated and deactivated and for transmitting that determination to the memory.

10. The telephone monitoring system of claim 1 wherein the keyboard contains programmable function keys.

11. The telephone monitoring system of claim 10 wherein at least one function key can access comments which are programed by a user of the system.

12. The telephone monitoring system of claim 1 wherein the memory contains a program which enables a user of the system to do at least one of:
   (a) sorting information stored in memory by date and outputting that sorted information to one of a printer, a display and a disc;
   (b) sorting information stored in memory by telephone number and outputting that sorted information to one of a printer, a display and a disc;
   (c) listing all calls stored in memory and outputting that list to one of a printer, a display and a disc; and
   (d) sorting information by comment entered through the keyboard.

13. The telephone monitoring system of claim 1 wherein the display is one of a liquid crystal display, a cathode ray tube and a flat screen.

14. The telephone monitoring system of claim 1 wherein the display is sized and configured to permit display of:
   (a) a target line telephone number;
   (b) date;
   (c) a telephone number dialed;
   (d) real time;
   (e) a time at which a telephone on the target telephone line is taken off hook;
   (d) a time at which a telephone on the target telephone is placed on hook;
   (e) duration of call;
   (f) audio status
   (g) comments entered through the keyboard;
   (h) alarm numbers;
   (i) data generated by a program in the memory; and
   (j) function key designations.

15. The telephone monitoring system of claim 14 wherein the display is capable of displaying all items set forth in claim 14 simultaneously.

16. The telephone monitoring system of claim 1 also comprising a disc attached to the memory and a program within the memory which causes automatic transfer of data from the memory to the disc whenever the memory contains a predetermined amount of data.

17. The telephone monitoring system of claim 1 wherein the memory contains a program which enables data to be entered into the memory from the monitor and from the keyboard at the same time.

18. The telephone monitoring system of claim 1 also comprising a slave unit through which the monitor is attached to a target telephone line.

* * * * *

UNITED STATES PATENT AND TRADEMARK OFFICE
CERTIFICATE OF CORRECTION

PATENT NO. : 4,815,120

DATED : March 21, 1989

INVENTOR(S) : MILO KOSICH

It is certified that error appears in the above-identified patent and that said Letters Patent is hereby corrected as shown below:

Column 2, line 63, change "or" to --for--.

Column 3, line 41, after "provide" insert --a lock--.

Column 3, line 68, after "which" insert --are telephone numbers entered by the operator that have special--.

Column 6, line 61, change "(d)" to --(f)--
line 63, change "(e)" to --(g)--
line 64, change "(f)" to --(h)--
line 65, change "(g)" to --(i)--
line 66, change "(h)" to --(j)--
line 67, change "(i)" to --(k)--
line 68, change "(j)" to --(l)--.

Signed and Sealed this

Twenty-eighth Day of November 1989

Attest:

JEFFREY M. SAMUELS

Attesting Officer   Acting Commissioner of Patents and Trademarks